US009170840B2

(12) United States Patent
Bozek et al.

(10) Patent No.: US 9,170,840 B2
(45) Date of Patent: Oct. 27, 2015

(54) DURATION SENSITIVE SCHEDULING IN A COMPUTING ENVIRONMENT

(75) Inventors: James J. Bozek, Bothell, WA (US); Nils P. Hansson, Monroe, WA (US); Edward S. Suffern, Chapel Hill, NC (US); James L. Wooldridge, Fall City, WA (US)

(73) Assignee: Lenova Enterprise Solutions (Singapore) Pte. Ltd., Singapore (SG)

( * ) Notice: Subject to any disclaimer, the term of this patent is extended or adjusted under 35 U.S.C. 154(b) by 541 days.

(21) Appl. No.: 13/287,691

(22) Filed: Nov. 2, 2011

(65) Prior Publication Data

US 2013/0111470 A1    May 2, 2013

(51) Int. Cl.
  *G06F 9/455*    (2006.01)
  *G06F 9/48*    (2006.01)

(52) U.S. Cl.
  CPC .................................. *G06F 9/4881* (2013.01)

(58) Field of Classification Search
  None
  See application file for complete search history.

(56) References Cited

U.S. PATENT DOCUMENTS

| 5,505,894 | A | 4/1996 | Frankfort et al. | |
|---|---|---|---|---|
| 6,591,262 | B1 | 7/2003 | MacLellan et al. | |
| 6,763,519 | B1 | 7/2004 | McColl et al. | |
| 7,065,764 | B1 * | 6/2006 | Prael et al. | 718/102 |
| 2006/0143204 | A1 * | 6/2006 | Fish | 707/101 |
| 2007/0240161 | A1 | 10/2007 | Prabhakar et al. | |
| 2008/0086729 | A1 * | 4/2008 | Kondoh et al. | 718/1 |
| 2008/0244601 | A1 * | 10/2008 | Zeis et al. | 718/104 |
| 2008/0271030 | A1 | 10/2008 | Herington | |
| 2009/0063753 | A1 | 3/2009 | Dow | |
| 2010/0050171 | A1 * | 2/2010 | Liang et al. | 718/1 |
| 2010/0153945 | A1 * | 6/2010 | Bansal et al. | 718/1 |
| 2010/0175064 | A1 * | 7/2010 | Brahmaroutu | 718/1 |
| 2010/0306776 | A1 * | 12/2010 | Greene | 718/101 |
| 2012/0110585 | A1 * | 5/2012 | Cosentino et al. | 718/102 |
| 2012/0131591 | A1 * | 5/2012 | Moorthi et al. | 718/104 |

OTHER PUBLICATIONS

Xu et al., "Filter Design and Analysis in Frequency Domain for Server Scheduling and Optimization", IEEE Transactions on Parallel and Distributed Systems, Nov. 2010, pp. 1573-1585, vol. 21, No. 11, IEEE Computer Society, USA.

(Continued)

*Primary Examiner* — Dong Kim
(74) *Attorney, Agent, or Firm* — Edward J. Lenart; Katherine S. Brown; Kennedy Lenart Spraggins LLP

(57) ABSTRACT

Duration sensitive scheduling in a computing environment, the computing environment including a computer configured to support a virtual machine, including: identifying, by a duration sensitive scheduler, a processing job to be executed by the virtual machine, wherein the virtual machine includes an entitlement specification that identifies physical resources of the computer that are designated for exclusive use by the virtual machine; determining, by the duration sensitive scheduler, a duration required to complete the processing job; identifying, by the duration sensitive scheduler, a time slot at which the physical resources of the computer that are identified in the entitlement specification are available for use by the virtual machine; scheduling, by the duration sensitive scheduler, the processing job for execution on the virtual machine during the time slot at which the physical resources of the computer that are identified in the entitlement specification are available for use by the virtual machine.

12 Claims, 4 Drawing Sheets

(56) References Cited

OTHER PUBLICATIONS

Wang et al., "Virtual Batching: Request Batching for Energy Conservation in Virtualized Servers", 18$^{th}$ International Workshop on Quality of Service (IWQoS), Jun. 2010, pp. 1-9, IEEE Computer Society, Beijing.

Lenovo, "Creating Linkage Between a Hypervisor's TPM Reporting and It's Supported VM Virtual TPM Reporting", IP.com Prior Art Database, IPCOM000147479D, Mar. 16, 2007, 1 page, IP.com, USA.

Bobroff et al., "New Metrics for Scheduling Jobs on a Cluster of Virtual Machines", Proceedings of the 35$^{th}$ Annual IEEE Computer Software and Applications Conference (COMPSAC 11), Jul. 2011, pp. 1-8, IEEE Computer Society, Munich, Germany.

Naik et al., "Adaptive Resource Sharing in a Web Services Environment", Proceedings of the 5$^{th}$ ACM/IFIP/USENIX International Conference on Middleware, Lecture Notes in Computer Science, Oct. 2004, pp. 311-330, vol. 3231, Canada.

Sotomayor et al., "Combining Batch Execution and Leasing Using Virtual Machines", High-Performance Parallel and Distributed Computing (HPDC) Computer Science Conference, Jun. 2008, pp. 1-10, Association for Computing Machinery (ACM) Digital Library, Boston, USA.

IBM, "IBM Tivoli Workload Scheduler-Job Scheduling Console", Tivoli User Guide, Dec. 2004, pp. 1-372, Feature Level 1.3, International Business Machines Corporation, USA.

Gucer et al., "Certification Guide Series: IBM Tivoli Workload Scheduler V8.4", IBM Redbooks, Aug. 25, 2008, pp. 1-276, International Business Machines Corporation, USA.

\* cited by examiner

DURATION SENSITIVE SCHEDULING IN A COMPUTING ENVIRONMENT

BACKGROUND OF THE INVENTION

1. Field of the Invention

The field of the invention is data processing, or, more specifically, methods, apparatus, and products for duration sensitive scheduling in a computing environment.

2. Description of Related Art

Modern computing systems can include physical resources such as computer processors, computer memory, and so on. Modern computing systems can also include virtual resources such as virtual machines that execute on the physical resources of the computing system. Virtual machines are frequently deployed on physical servers in a manner that does not take into account the operations to be performed by the virtual machine, leading to an inefficient use of system resources.

SUMMARY OF THE INVENTION

Methods, apparatus, and products for duration sensitive scheduling in a computing environment, the computing environment including a computer configured to support a virtual machine, including: identifying, by a duration sensitive scheduler, a processing job to be executed by the virtual machine, wherein the virtual machine includes an entitlement specification that identifies physical resources of the computer that are designated for exclusive use by the virtual machine; determining, by the duration sensitive scheduler, a duration required to complete the processing job; identifying, by the duration sensitive scheduler, a time slot at which the physical resources of the computer that are identified in the entitlement specification are available for use by the virtual machine; scheduling, by the duration sensitive scheduler, the processing job for execution on the virtual machine during the time slot at which the physical resources of the computer that are identified in the entitlement specification are available for use by the virtual machine.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
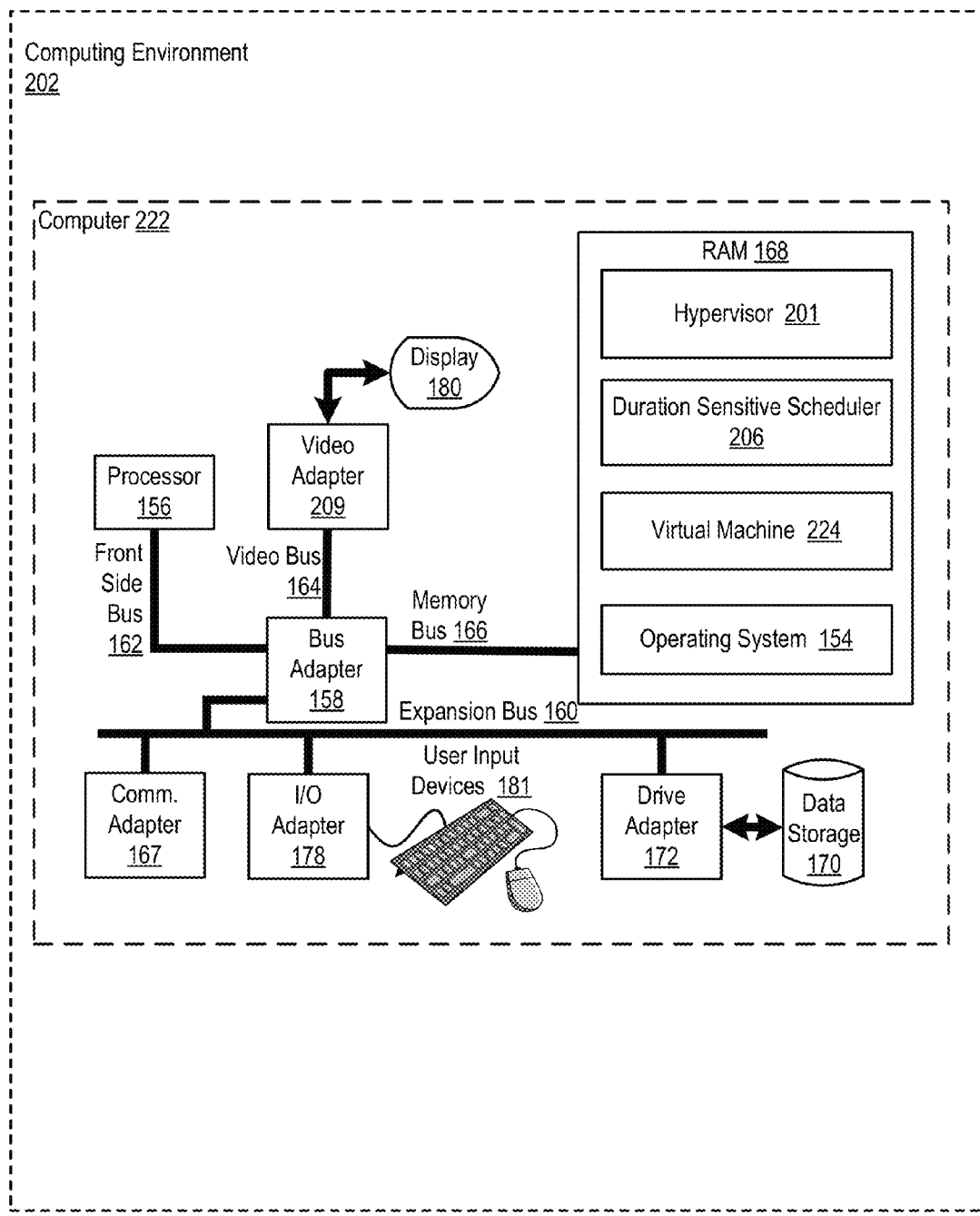
FIG. 1 sets forth a block diagram of automated computing machinery comprising a computing environment in which duration sensitive scheduling is implemented according to embodiments of the present invention.

Exemplary methods, apparatus, and products for duration sensitive scheduling in a computing environment in accordance with the present invention are described with reference to the accompanying drawings, beginning with FIG. 1. FIG. 1 sets forth a block diagram of automated computing machinery comprising a computing environment in which duration sensitive scheduling is implemented according to embodiments of the present invention. The computing environment (202) of FIG. 1 includes at least one computer processor (156) or 'CPU' as well as random access memory (168) ('RAM') which is connected through a high speed memory bus (166) and bus adapter (158) to processor (156) and to other components of the computing environment (202).

Stored in RAM (168) is a virtual machine (224). In the example of FIG. 1, the virtual machine (224) is a software implementation of a machine, such as a computer (222). Through the use of virtual machines, the underlying resources of the physical machine that the virtual machines run on may be shared between different virtual machines, each of which may run its own operating system. The software layer providing the virtualization is called a virtual machine monitor or hypervisor (201). A hypervisor (201) is a module of automated computing machinery that performs software and hardware platform-virtualization in order to enable multiple operating systems to run on a host computer concurrently in separate virtual machines. A hypervisor runs directly on the host's hardware to control hardware access and to monitor guest operating-systems.

Also stored in RAM (168) is a duration sensitive scheduler (206). The duration sensitive scheduler (206) is a module is computer program instructions that, when executed, is capable of scheduling processing jobs amongst virtual machines (224) supported by a computer (222). Each processing job represents a series of computer program instructions that carry out a specific task when executed by a computer processor. The processing jobs of FIG. 1 may be embodied, for example, as a virus scan that scans computer memory to identify computer viruses. Such a virus scan may search computer memory to identify known patterns of data within executable code that corresponds to a known computer virus. Alternatively, the processing jobs of FIG. 1 may be embodied as a data storage backup operation in which sections of computer memory are copied and stored in backup memory locations such as, for example, in off-site computer memory, on magnetic tape, on optical media, and so on. In the example of FIG. 1, the processing jobs may be embodied as a series of computer program instructions that carry out a specific task, such as batch processing jobs and others as will occur to those of skill in the art.

The duration sensitive scheduler (206) is configured for duration sensitive scheduling in a computing environment (202). The duration sensitive scheduler (206) may carry out duration sensitive scheduling by identifying a processing job to be executed on the virtual machine (224). The duration sensitive scheduler (206) may further carry out duration sensitive scheduling by determining a duration required to complete the processing job on the virtual machine (224). The duration required to complete the processing job on the virtual machine (224) will be impacted by the underlying physical resources of the computer (222) that the virtual machine (224) is given access to. For example, if the virtual machine (224) is given access to a large amount of the computer's (222) high-speed cache memory, a memory-intensive processing job may execute quickly while a processor-intensive processing job may execute more slowly. The duration sensitive scheduler (206) may determine a duration required to complete the processing job on the virtual machine (224), for example, by executing the processing job on the virtual machine (224) and recording the amount of time that was required to execute the processing job. Alternatively, the duration sensitive scheduler (206) may determine a duration required to complete the processing job on the virtual machine (224) by estimating the amount of time that is required to execute the processing job on the virtual machine (224). Estimating the amount of time that is required to execute the processing job on the virtual machine (224) may be carried out by inspecting each individual instruction and estimating the amount of time required to execute an instruction of that nature on the virtual machine (224) in view of the amount of physical resources that will be made available to the virtual machine (224).

The duration sensitive scheduler (206) may further carry out duration sensitive scheduling by identifying a time slot at which the physical resources of the computer (222) are available for use by the virtual machine (224). The computer (222) of FIG. 1 may experience different workloads at different times. Consider an example in which the computer (222) is part of a restaurant's online ordering system and the processing job to be executed is a task that runs payroll for the restaurant's employees. In such an example, the computer (222) may be busy processing food orders during standard dining hours, while the computer (222) may be almost entirely unused after the restaurant has closed. In such an example, it is beneficial to schedule the processing job during hours at which the restaurant is closed so that the computer (222) is not busy running payroll when customers are attempting to place orders. Identifying a time slot at which the physical resources of the computer (222) are available for use by the virtual machine (224) may therefore be carried out, for example, by inspecting historical records of physical resource utilization to identify low utilization periods. Alternatively, identifying a time slot at which the physical resources of the computer (222) are available for use by the virtual machine (224) may be carried out by inspecting a list of scheduled processing jobs.

The duration sensitive scheduler (206) may further carry out duration sensitive scheduling by scheduling the processing job for execution on the virtual machine (224) during the time slot at which the physical resources of the computer (222) are available for use by the virtual machine (224). Because the processing job is scheduled for execution on the virtual machine (224) during the identified time slot, the virtual machine (224) may be invoked and given exclusive access to the physical resources of the computer (222) that are identified in an entitlement specification for the virtual machine (224) at the beginning of the identified time slot. The virtual machine (224) may subsequently execute the processing job during the identified time slot using the physical resources of the computer (222) that are identified in the entitlement specification.

Also stored in RAM (168) is an operating system (154). Operating systems useful duration sensitive scheduling in a computing environment (202) according to embodiments of the present invention include UNIX™, Linux™, Microsoft XP™, AIX™, IBM's i5/OS™, and others as will occur to those of skill in the art. The operating system (154), virtual machines (220, 224, 228), and duration sensitive scheduler (206) in the example of FIG. 1 are shown in RAM (168), but many components of such software typically are stored in non-volatile memory also, such as, for example, on a disk drive (170).

The computing environment (202) of FIG. 1 includes disk drive adapter (172) coupled through expansion bus (160) and bus adapter (158) to processor (156) and other components of the computing environment (202). Disk drive adapter (172) connects non-volatile data storage to the computing environment (202) in the form of disk drive (170). Disk drive adapters useful in computers for duration sensitive scheduling in a computing environment (202) according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computing environment (202) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computing environment (202) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computing environment (202) of FIG. 1 includes a communications adapter (167) for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for duration sensitive scheduling in a computing environment (202) according to embodiments of the present invention include modems for wired dial-up communications, Ethernet (IEEE 802.3) adapters for wired data communications network communications, and 802.11 adapters for wireless data communications network communications.

Figure 2:
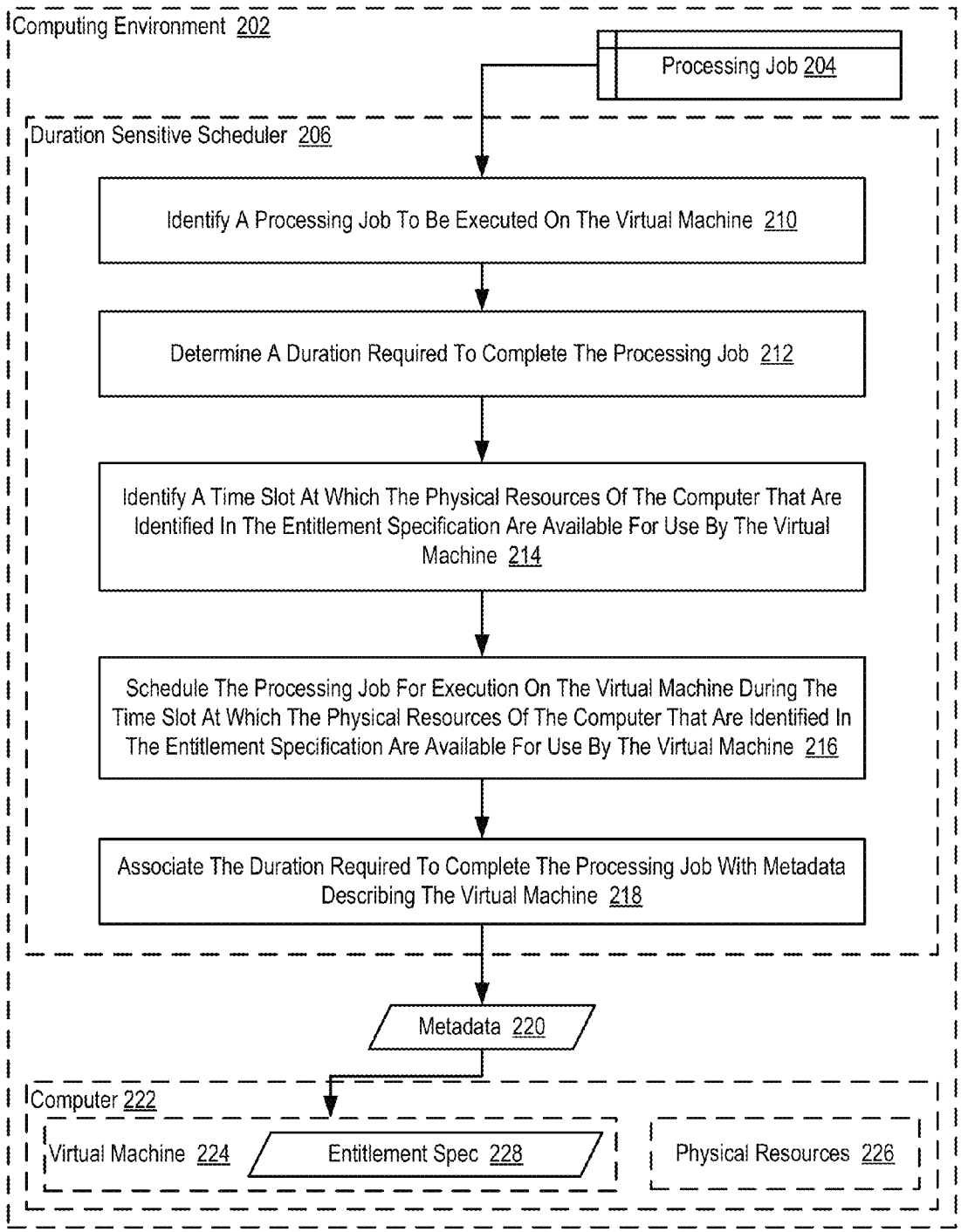
FIG. 2 sets forth a flow chart illustrating an exemplary method for duration sensitive scheduling in a computing environment according to embodiments of the present invention.

For further explanation, FIG. 2 sets forth a flow chart illustrating an exemplary method for duration sensitive scheduling in a computing environment according to embodiments of the present invention. The example method of FIG. 2 is carried out in a computing environment (202) that includes a virtual machine (224) executing on a computer (222). In the example method of FIG. 2, the virtual machine (224) is a software implementation of a machine, such as the computer (222). Through the use of virtual machines, the underlying physical resources (226) of the physical machine that the virtual machines run on may be shared between different virtual machines, each of which may run its own operating system. The underlying physical resources (226) of the physical machine that the virtual machines run on can include, for example, computer memory, computer processors, network adapters, and so on.

The software layer providing the virtualization is called a virtual machine monitor or hypervisor. A hypervisor is a module of automated computing machinery that performs software and hardware platform-virtualization in order to enable multiple operating systems to run on a host computer concurrently in separate virtual machines. A hypervisor runs directly on the host's hardware to control hardware access and to monitor guest operating-systems. Although the example of FIG. 2 only depicts a single virtual machine (224) running on a single computer (222), readers will appreciate that the computing environment (202) may contain additional computers. Furthermore, each computer (222) may support many virtual machines.

In the example of FIG. 2, the virtual machine (224) includes an entitlement specification (228) that identifies physical resources (226) of the computer (224) that are designated for exclusive use by the virtual machine (224). The entitlement specification (228) may include, for example, information identifying an amount of physical memory that is to be made available to the virtual machine (224), information identifying computer processors that are to be made available to the virtual machine (224), and so on.

The example method of FIG. 2 includes identifying (210), by a duration sensitive scheduler (206), a processing job (204) to be executed on the virtual machine (224). In the example method of FIG. 2, the duration sensitive scheduler (206) is a module is computer program instructions that, when executed, is capable of scheduling processing jobs for execution on a virtual machine (224). In the example of FIG. 2, the processing job (204) represents a series of computer program instructions that carry out a specific task when executed by a computer processor. The processing job (204) of FIG. 2 may be embodied, for example, as a virus scan that scans computer memory to identify computer viruses. Such a virus scan may search computer memory to identify known patterns of data within executable code that corresponds to a known computer virus. Alternatively, the processing job (204) of FIG. 2 may be embodied as a data storage backup operation in which sections of computer memory are copied and stored in backup memory locations such as, for example, in off-site computer memory, on magnetic tape, on optical media, and so on. In the example method of FIG. 2, the processing job (204) may be embodied as a series of computer program instructions that carry out a specific task, such as batch processing jobs and others as will occur to those of skill in the art.

The example method of FIG. 2 includes determining (212), by the duration sensitive scheduler (206), a duration required to complete the processing job (204) on the virtual machine (224). The duration required to complete the processing job (204) on the virtual machine (224) will be impacted by the underlying physical resources (226) of the computer (222) that the virtual machine (224) is given access to. For example, if the virtual machine (224) is given access to a large amount of the computing system's (202) high-speed cache memory, a memory-intensive processing job may execute quickly while a processor-intensive processing job may execute more slowly. In the example method of FIG. 2, determining (212) a duration required to complete the processing job (204) on the virtual machine (224) may be carried out, for example, by executing the processing job (204) on the virtual machine (224) and recording the amount of time that was required to execute the processing job (204). Alternatively, determining (212) a duration required to complete the processing job (204) on the virtual machine (224) may also be carried out by estimating the amount of time that is required to execute the processing job (204) on the virtual machine (224). Estimating the amount of time that is required to execute the processing job (204) on the virtual machine (224) may be carried out by inspecting each individual instruction and estimating the amount of time required to execute an instruction of that nature on the virtual machine (224) in view of the amount of physical resources (226) that will be made available to the virtual machine (224).

Consider an example in which the processing job (204) is a data storage backup operation that consists of 100 data read operations and 100 data write operations. In such an example, the duration sensitive scheduler (206) may initiate a data read operation on the virtual machine (224) and also initiate a data write operation on the virtual machine (224) to determine a measured completion time for each type of operation on the virtual machine (224). The duration sensitive scheduler (206) may subsequently utilize the measured completion time for each type of operation on the virtual machine (224) to predict the total duration required to complete the processing job (204).

The example method of FIG. 2 also includes identifying (214), by the duration sensitive scheduler (206), a time slot at which the physical resources of the computer (222) that are identified in the entitlement specification (228) are available for use by the virtual machine (224). In the example method of FIG. 2, the computer (222) may experience different workloads at different times. Consider an example in which the computer (222) is part of a restaurant's online ordering system and the processing job (204) to be executed is a task that runs payroll for the restaurant's employees. In such an example, the computer (222) may be busy processing food orders during standard dining hours, while the computer (222) may be almost entirely unused after the restaurant has closed. In such an example, it is beneficial to schedule the processing job (204) during hours at which the restaurant is closed so that the computer (222) is not busy running payroll when customers are attempting to place orders. Identifying (214) a time slot at which the physical resources of the computer (222) that are identified in the entitlement specification (228) are available for use by the virtual machine (224) may therefore be carried out, for example, by inspecting historical records of physical resource (226) utilization to identify low utilization periods. Alternatively, identifying (214) a time slot at which the physical resources of the computer (222) that are identified in the entitlement specification (228) are available for use by the virtual machine (224) may be carried out by inspecting a list of scheduled processing jobs.

The example method of FIG. 2 also includes scheduling (216), by the duration sensitive scheduler (206), the processing job (204) for execution on the virtual machine (224) during the time slot at which the physical resources (226) of the computer (222) that are identified in the entitlement specification (228) are available for use by the virtual machine (224). In the example of FIG. 2, because the processing job (204) is scheduled (216) for execution on the virtual machine (224) during the identified time slot, the virtual machine (224) may be invoked and given exclusive access to the physical resources (226) of the computer (222) that are identified in the entitlement specification (228) at the beginning of the identified time slot. The virtual machine (224) may subsequently execute the processing job (204) during the identified time slot using the physical resources (226) of the computer (222) that are identified in the entitlement specification (228).

The example method of FIG. 2 also includes, associating (218) the duration required to complete the processing job (204) with metadata (220) describing the virtual machine (224). In the example of FIG. 2, metadata (220) describing the virtual machine (224) is information describing characteristics of the virtual machine (224). The metadata (220) describing the virtual machine (224) may therefore serve as a definition of the virtual machine (224) that includes, for example, information identifying the physical resources (226) that the virtual machine (224) has access to, information describing scheduled run-times for the virtual machine (224), and so on. The metadata (220) describing the virtual machine (224) may also include an identification of one or more physical machines that the virtual machine (224) is hosted by, an identification of the operating system that is executing on each physical machine that hosts the virtual machine (224), and other information as will occur to those of skill in the art.

In the example method of FIG. 2, associating (218) the duration required to complete the processing job (204) with metadata (220) describing the virtual machine (224) may be carried out, for example, by creating an entry in the metadata (220) that includes, for example, a unique identifier for the processing job (204), the amount of time that was required to complete the processing job (204) on the virtual machine (224), the time and date that the processing job (204) was initiated, the number and type of instructions that were included in the processing job (204), a date stamp indicating the next scheduled invocation of the processing job (204), and so on.

Because metadata (220) describing the virtual machine (224) can serve as a definition of the virtual machine (224), by associating (218) the duration required to complete the processing job (204) with metadata (220) describing the virtual machine (224), performance characteristics and system resource utilization characteristics for each virtual machine (224) may be extracted from the metadata (220) and used to schedule processing jobs and allocate system resources.

Figure 3:
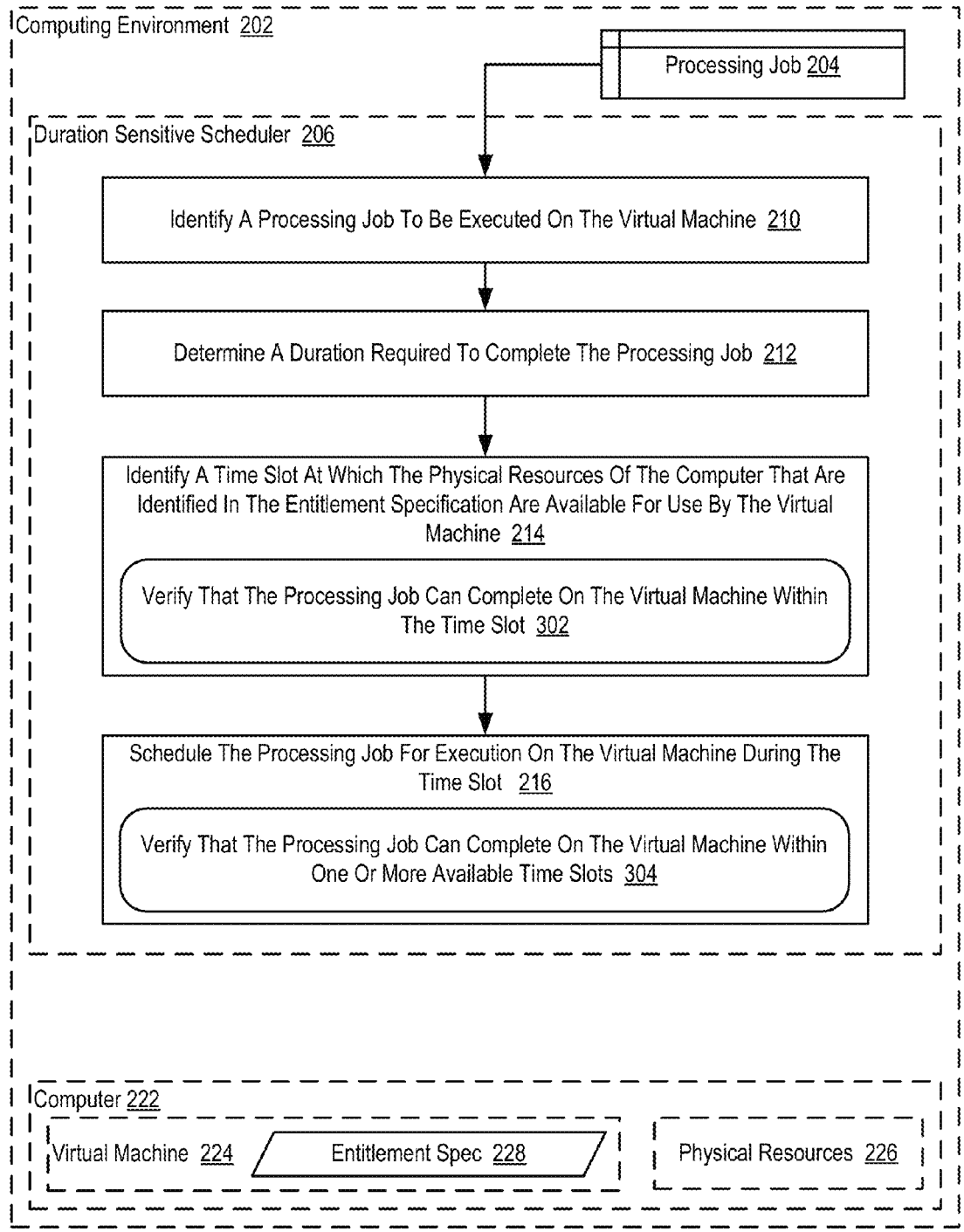
FIG. 3 sets forth a flow chart illustrating a further exemplary method for duration sensitive scheduling in a computing environment according to embodiments of the present invention.

For further explanation, FIG. 3 sets forth a flow chart illustrating an exemplary method for duration sensitive scheduling in a computing environment according to embodiments of the present invention. The example method of FIG. 3 is similar to the example method of FIG. 2, as it also includes identifying (210) a processing job (204) to be executed by virtual machine (224), determining (212) a duration required to complete the processing job (204) on the virtual machine (224), identifying (214) a time slot at which the physical resources (226) of the computer (222) that are identified in the entitlement specification (228) are available for use by the virtual machine (224), and scheduling (216) the processing job (204) for execution on the virtual machine (224) during the time slot at which the physical resources (226) of the computer (222) that are identified in the entitlement specification (228) are available for use by the virtual machine (224).

In the example method of FIG. 3, identifying (214) a time slot at which the physical resources (226) of the computer (222) that are identified in the entitlement specification (228) are available for use by the virtual machine (224) optionally includes verifying (302) that the processing job (204) can complete on the virtual machine (224) within the time slot. In the example method of FIG. 3, verifying (302) that the processing job (204) can complete on the virtual machine (224) within the time slot may be carried out by comparing the duration required to complete the processing job (204) against the amount of time available in the time slot. In such a way, time slots that are not large enough to complete the processing job (204) are not treated as candidate time slots for scheduling the processing job (204). Verifying (302) that the processing job (204) can complete on the virtual machine (224) within the time slot is depicted in FIG. 3 as being an optional step because it is possible in some embodiments that there is no single time slot that is large enough to complete the processing job (204). In such an example, carrying out this step would result in no candidate time slots for scheduling the processing job (204) being identified (214).

In the example method of FIG. 3, scheduling (216) the processing job (204) for execution on the virtual machine (224) during the time slot at which the physical resources (226) of the computer (222) that are identified in the entitlement specification (228) are available for use by the virtual machine (224) can optionally include verifying (304) that the processing job (204) can complete on the virtual machine (224) within one or more available time slots. In the example method of FIG. 3, verifying (304) that the processing job (204) can complete on the virtual machine (224) within one or more available time slots may be carried out by comparing the duration required to complete the processing job (204) against the amount of time available in the one or more available time slots. In such a way, a time slot or combination of time slots that are not large enough to complete the processing job (204) are not treated as candidate time slots for scheduling the processing job (204).

Figure 4:
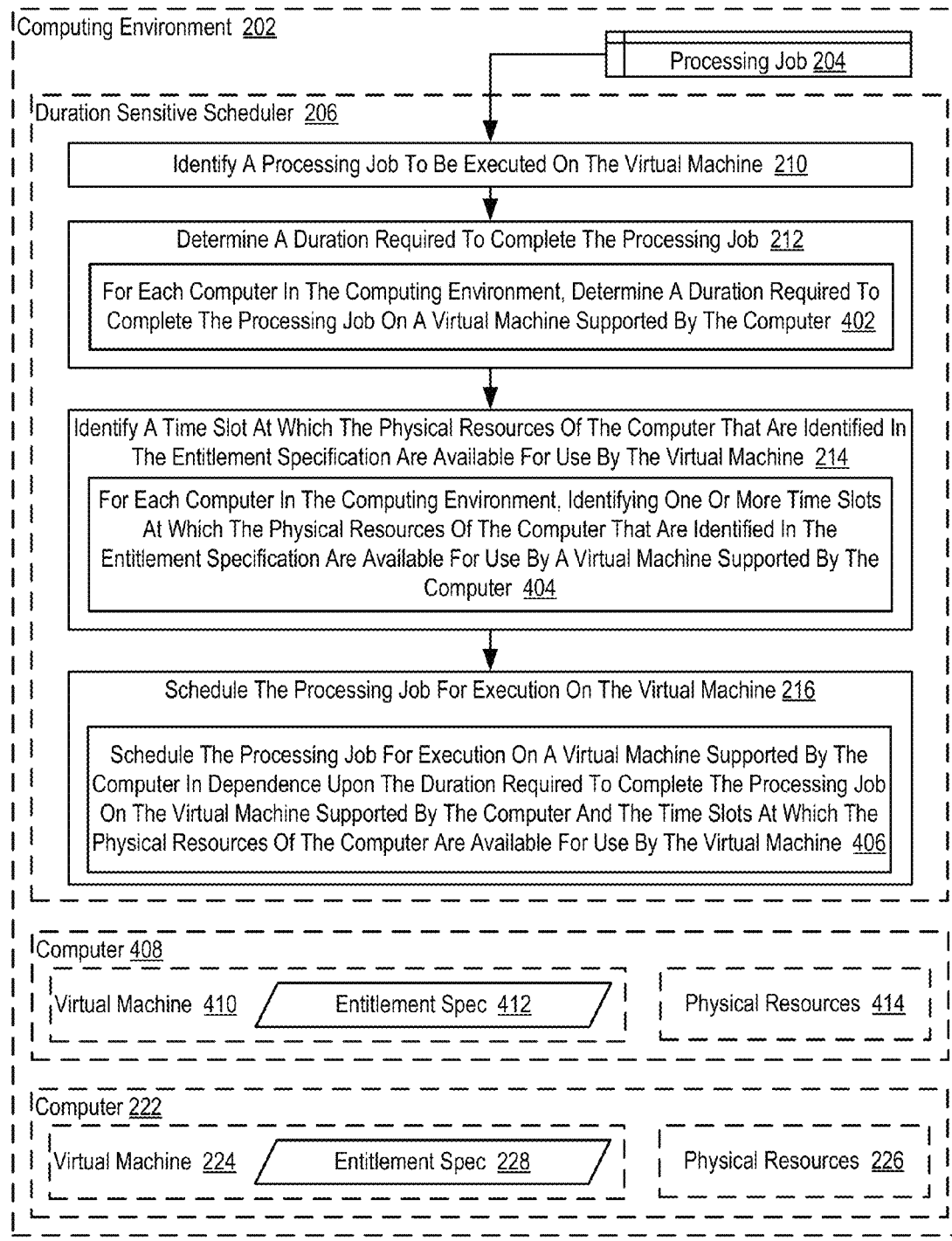
FIG. 4 sets forth a flow chart illustrating a further exemplary method for duration sensitive scheduling in a computing environment according to embodiments of the present invention.

For further explanation, FIG. 4 sets forth a flow chart illustrating an exemplary method for duration sensitive scheduling in a computing environment according to embodiments of the present invention. The example method of FIG. 4 is similar to the example method of FIG. 2, as it also includes identifying (210) a processing job (204) to be executed by a virtual machine (224, 410), determining (212) a duration required to complete the processing job (204) on the virtual machine (224, 410), identifying (214) a time slot at which the physical resources (226, 414) of the computer (222, 408) that are identified in the entitlement specification (228, 412) are available for use by the virtual machine (224, 410), and scheduling (216) the processing job (204) for execution on the virtual machine (224, 410) during the time slot at which the physical resources (226, 414) of the computer (222, 408) that are identified in the entitlement specification (228, 412) are available for use by the virtual machine (224, 410). In the example method of FIG. 4, however, the computing environment (202) includes a plurality of computers (222, 408). Each computer (222, 408) is configured to support a virtual machine (224, 410).

In the example method of FIG. 4, determining (212) a duration required to complete the processing job (204) on the virtual machine (224, 410) includes, for each computer (222, 408) in the computing environment (202), determining (402) a duration required to complete the processing job (204) on a virtual machine (224, 408) supported by the computer (222, 408). Because each computer (222, 408) in the computing environment (202) may have different physical resources (226, 414) that may be allocated for use by a virtual machine (224, 410) supported by the computer (222, 408), the amount of time required to complete the processing job (204) on the virtual machines (224, 410) may be different. As such, in the example of FIG. 4, the amount of time required to complete the processing job (204) using a virtual machine (224, 410) supported by the computer (222, 408) is determined (402) for each of the computers (222, 408). For example, the same processing job (204) may take 15 minutes to complete using the virtual machine (224) supported by a first computer (222) and only 10 minutes to complete using the virtual machine (410) supported by a second computer (408).

In the example method of FIG. 4, identifying (214) a time slot at which the physical resources (226, 414) of the computer (222, 408) are available for use by the virtual machine (224, 410) includes, for each computer (222, 408) in the computing environment (202), identifying (404) one or more time slots at which the physical resources (226, 414) of the computer (222, 408) that are identified in the entitlement specification (228, 412) are available for use by a virtual machine (224, 410) supported by the computer (222, 408).

Because each computer (222, 408) in the computing environment (202) may have different tasks that are scheduled to be performed, the time slots at which the physical resources (226, 414) of the computer (222, 408) are available for use may be different. As such, in the example of FIG. 4, the time slots at which the physical resources (226, 414) of the computer (222, 408) are available for use by a virtual machine (224, 410) are identified (404) for each of the computers (222, 408). For example, the physical resources (226) of the first computer (222) that are identified in the entitlement specification (228) may only be available for use by the virtual machine (224) that is supported by the computer (222) from 1 A.M. until 2 A.M. one day per week. The physical resources (414) of the second computer (408) that are identified in the entitlement specification (412), however, may be available for use by the virtual machine (410) that is supported by the computer (408) from 1 A.M. until 6 A.M. every day of the week. Such a situation may arise, for example, because the second computer (408) is a backup computer that is used less frequently, because the second computer (408) has more physical resources (414) than the first computer (222), and for many other reasons.

In the example method of FIG. 4, scheduling (216) the processing job (204) for execution on the virtual machine (224, 410) during the time slot at which the physical resources (226, 414) of the computer (222, 408) are available for use by the virtual machines (224, 410) includes scheduling (406) the processing job (204) for execution on a virtual machine (224, 410) supported by the computer (222, 408) in dependence upon the duration required to complete the processing job (204) on the virtual machine (224, 410) supported by the computer (222, 408) and the time slots at which the physical resources (226, 414) of the computer (222, 408) are available for use by the virtual machine (224, 410).

Consider an example in which the processing job (204) takes 1 hour to execute using the virtual machine (224) supported by the first computer (222) and 4 hours to execute using the virtual machine (410) on the second computer (408). In such an example, if both computers (222, 408) have uninterrupted time slots of 4 hours during which the physical resources (226, 414) of each computer (222, 408) are available for use by the virtual machine (224, 410), it would be beneficial to schedule the processing job (204) for execution using the virtual machine (222) on the first computer (222) so as to retain the highest amount of remaining availability between the computers (222, 408) and complete the processing job (204) in the least amount of time. Alternatively, if the first computer (222) only has a single 1 hour time slot during which its physical resources (226) are available for use by its virtual machine (224) while the physical resources (414) of the second computer (408) are available for use by its virtual machine (224) at all times, it would be beneficial to schedule the processing job (204) for execution using the virtual machine (410) on the second computer (408) so as to retain availability on each computer (222, 408) and not overburden the computer (222) that is already experiencing a higher workload.

As shown in the example above, scheduling (406) the processing job (204) for execution on a virtual machine (224, 410) supported by the computer (222, 408) in dependence upon the duration required to complete the processing job (204) on the virtual machine (224, 410) supported by the computer (222, 408) and the time slots at which the physical resources (226, 414) of the computer (222, 408) are available for use by the virtual machine (224, 410) can be carried out in a variety of ways. Scheduling (406) the processing job (204) for execution on a virtual machine (224, 410) supported by the computer (222, 408) in dependence upon the duration required to complete the processing job (204) on the virtual machine (224, 410) supported by the computer (222, 408) and the time slots at which the physical resources (226, 414) of the computer (222, 408) are available for use by the virtual machine (224, 410) can be carried out using a rules based approach in which the processing job (204) is assigned to the computer that can execute it the fastest, using a rules based approach in which the processing job (204) is assigned to the computer that has the highest amount of availability, using a rules based approach in which the processing job (204) is assigned to the computer that has the smallest workload, and so on.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
   by a duration sensitive scheduler on a computing device,
   identifying a processing job to be executed by a virtual machine supported by a computer in a computing environment, wherein the virtual machine includes an entitlement specification;
   determining, based on the entitlement specification in the virtual machine, physical resources of the computer that are designated for exclusive use by the virtual machine;
   determining a duration required to complete the processing job on the virtual machine by inspecting each individual instruction of the processing job and estimating an amount of time required to execute the processing job on the virtual machine in view of an amount of physical resources to be made available;
   associating the duration required to complete the processing job with metadata describing the virtual machine including creating an entry in the metadata comprising a unique identifier for the processing job and a number and type of instructions included in the processing job;
   in response to determining the duration required and associating with the metadata, identifying a time slot at which the physical resources of the computer that are identified in the entitlement specification are available for use by the virtual machine;
   scheduling the processing job for execution on the virtual machine during the time slot at which the physical resources of the computer that are identified in the entitlement specification are available for use by the virtual machine.

2. The method of claim 1 wherein identifying the time slot at which the physical resources of the computer that are identified in the entitlement specification are available for use by the virtual machine further comprises verifying that the processing job can complete on the virtual machine within the time slot.

3. The method of claim 1 wherein scheduling the processing job for execution on the virtual machine during the time slot at which the physical resources of the computer that are identified in the entitlement specification are available for use by the virtual machine further comprises verifying that the processing job can complete on the virtual machine within the time slot.

4. The method of claim 1 wherein the processing job is data storage backup operation.

5. An apparatus comprising a computing device, a computer processor, a computer memory operatively coupled to the computer processor, the computer memory having disposed within it computer program instructions that, when executed by the computer processor, cause a duration sensitive scheduler to carry out the steps of:
   identifying a processing job to be executed by a virtual machine supported by a computer in a computing environment, wherein the virtual machine includes an entitlement specification;
   determining, based on the entitlement specification in the virtual machine, physical resources of the computer that are designated for exclusive use by the virtual machine;
   determining a duration required to complete the processing job on the virtual machine by inspecting each individual instruction of the processing job and estimating an amount of time required to execute the processing job on the virtual machine in view of an amount of physical resources to be made available;

associating the duration required to complete the processing job with metadata describing the virtual machine including creating an entry in the metadata comprising a unique identifier for the processing job and a number and type of instructions included in the processing job;

in response to determining the duration required and associating with the metadata, identifying a time slot at which the physical resources of the computer that are identified in the entitlement specification are available for use by the virtual machine;

scheduling the processing job for execution on the virtual machine during the time slot at which the physical resources of the computer that are identified in the entitlement specification are available for use by the virtual machine.

6. The apparatus of claim 5 wherein identifying the time slot at which the physical resources of the computer that are identified in the entitlement specification are available for use by the virtual machine further comprises verifying that the processing job can complete on the virtual machine within the time slot.

7. The apparatus of claim 5 wherein scheduling the processing job for execution on the virtual machine during the time slot at which the physical resources of the computer that are identified in the entitlement specification are available for use by the virtual machine further comprises verifying that the processing job can complete on the virtual machine within the time slot.

8. The apparatus of claim 5 wherein the processing job is data storage backup operation.

9. A computer program product including a computer readable medium, where the computer readable medium is non-transitory, the computer program product comprising computer program instructions that, when executed, cause a computer using a duration sensitive scheduler to carry out the steps of:

identifying a processing job to be executed by a virtual machine supported by a computer in a computing environment, wherein the virtual machine includes an entitlement specification;

determining, based on the entitlement specification in the virtual machine, physical resources of the computer that are designated for exclusive use by the virtual machine;

determining a duration required to complete the processing job on the virtual machine by inspecting each individual instruction of the processing job and estimating an amount of time required to execute the processing job on the virtual machine in view of an amount of physical resources to be made available;

associating the duration required to complete the processing job with metadata describing the virtual machine including creating an entry in the metadata comprising a unique identifier for the processing job and a number and type of instructions included in the processing job;

in response to determining the duration required and associating with the metadata, identifying a time slot at which the physical resources of the computer that are identified in the entitlement specification are available for use by the virtual machine;

scheduling the processing job for execution on the virtual machine during the time slot at which the physical resources of the computer that are identified in the entitlement specification are available for use by the virtual machine.

10. The computer program product of claim 9 wherein identifying the time slot at which the physical resources of the computer that are identified in the entitlement specification are available for use by the virtual machine further comprises verifying that the processing job can complete on the virtual machine within the time slot.

11. The computer program product of claim 9 wherein scheduling the processing job for execution on the virtual machine during the time slot at which the physical resources of the computer that are identified in the entitlement specification are available for use by the virtual machine further comprises verifying that the processing job can complete on the virtual machine within the time slot.

12. The computer program product of claim 9 wherein the processing job is data storage backup operation.

* * * * *